(12) United States Patent
Roelens et al.

(10) Patent No.: US 8,019,846 B2
(45) Date of Patent: Sep. 13, 2011

(54) REMOTE ACTIVATION OF HOME DEVICES

(75) Inventors: Wim Roelens, Temse (BE); Arabinda Bose, Cedar Park, TX (US); Jeremy Remington, Austin, TX (US); Jeremy De Clercq, Sint-Denijs-Westrem (BE)

(73) Assignee: Alcatel Lucent, Paris (FR)

( * ) Notice: Subject to any disclaimer, the term of this patent is extended or adjusted under 35 U.S.C. 154(b) by 732 days.

(21) Appl. No.: 11/955,376

(22) Filed: Dec. 12, 2007

(65) Prior Publication Data

US 2008/0147840 A1 Jun. 19, 2008

(30) Foreign Application Priority Data

Dec. 13, 2006 (EP) ..................................... 06291916

(51) Int. Cl.
*G06F 15/16* (2006.01)
(52) U.S. Cl. ....................................................... 709/223
(58) Field of Classification Search ................... 709/223
See application file for complete search history.

(56) References Cited

U.S. PATENT DOCUMENTS

| 6,901,439 B1 | 5/2005 | Bonasia et al. |
| 2004/0010327 A1 | 1/2004 | Tershima et al. |
| 2005/0038875 A1 | 2/2005 | Park |
| 2005/0081045 A1* | 4/2005 | Nicodemus et al. .......... 713/182 |
| 2006/0168178 A1 | 7/2006 | Hwang et al. |
| 2007/0022469 A1* | 1/2007 | Cooper et al. .................... 726/3 |
| 2007/0112957 A1* | 5/2007 | Shastri et al. ................. 709/224 |

FOREIGN PATENT DOCUMENTS

EP 1667359 A1 7/2006

OTHER PUBLICATIONS

DSLHOME-Technical Working Group: "CPE WAN Management Protocol" Internet Citation, May 2004, XP002316355.

* cited by examiner

*Primary Examiner* — Wing F Chan
*Assistant Examiner* — Andrew Woo
(74) *Attorney, Agent, or Firm* — Hitt Gaines, PC

(57) ABSTRACT

Method for remote management of a home device (3), said method comprising:
  a connection step wherein the home device (3) connects to a remote walled garden home device management (WG_HDM) server (10);
  a pre-activation cycle wherein a pre-activation policy is run on the home device (3) from the WG_HDM server (10);
  a transfer step wherein the home device (3) is redirected by the WG_HDM server (10) to a remote public home device management (P_HDM) server (14);
  an activation cycle wherein an activation policy is run on the home device (3) from the P_HDM server (14).

8 Claims, 2 Drawing Sheets

REMOTE ACTIVATION OF HOME DEVICES

The present invention relates to the remote management of home devices from a remote network.

Recent times have witnessed the wide spread of the Internet, not only for professional purpose, but also at home. Consumers are offered more and more home electronic devices equipped with Internet connect capabilities, such as digital subscriber line (DSL) modems, residential gateways (RGW), set-top boxes (STB) for digital television (DTV), Voice over the Internet Protocol (VoIP) terminal adapters, etc. Such devices are commonly called "home devices" or "customer premise equipment" (CPE) and are linked together to form a local area or home network (LAN) connected to a wide area network (WAN) such as the Internet.

CPEs have become such advanced devices that it is more and more difficult for the average user to undertake any configuration change, firmware upgrade, backup, restore or other management operations without the help of a skilled technician.

In addition, there is unquestionably a need from users to avoid manual management operations on CPEs. Although such operations were considered acceptable in the near past (see e.g. U.S. Pat. No. 6,901,439 to Bonasia), they are now considered by the users as time consuming and therefore unacceptable.

These are reasons why many network operators now propose, in addition to the classic Internet provider's services, management services for remotely managing LAN CPEs. Such services advantageously allow operators to save costs by reducing truck rolls (i.e. a technician is actually sent to the user's premises to do the required or necessary management operations).

However, a consequence of such a policy is that operators have the duty to manage a large number of CPEs for the entire life cycle of the devices. Over a period of time the device population grows and so is the number of the device types which the operator's system must adapt to.

The devices may arrive at the subscriber's premises via multiple means, for example from the CPE manufacturer directly, from a retail store or from the operator. It is extremely difficult, time consuming and error-prone for operators to get all information concerning each CPE and store them in the operator's database or in home device management servers prior to the device first contacting its management server.

For the operator, pre-provisioning the CPE information is pretty significant. On the one hand, it reduces the opportunity for the operator to grow its subscriber population quickly. On the other hand, it adds computing overhead (and related costs) for the operator's system to be able to learn all the details about each and every new purchased and connected CPE, before the latter gets in position to be activated in the network.

Management policies are disclosed in "CPE WAN Management Protocol", a technical report from the DSL Forum TR-069, produced by the DSLHome-Technical Working Group in 2004.

Remote management/control methods are also disclosed in US patent applications no. 2006/0168178 (Hwang), 2005/0038875 (Park) and 2004/0010327 (Terashima).

The known CPE management methods fail to overcome the drawbacks mentioned hereinbefore. Therefore, there is still a need for improving the remote management of CPEs, allowing operators to reduce CPE information retrieval and database storing operations.

In order to achieve the above and other objects, there is provided a method for remote management of a home device, said method comprising:
  a connection step wherein the home device connects to a remote walled garden home device management (WG_HDM) server;
  a pre-activation cycle wherein a pre-activation policy is run on the home device from the WG_HDM server;
  a transfer step wherein the home device is redirected by the WG_HDM server to a remote public home device management (P_HDM) server;
  an activation cycle wherein an activation policy is run on the home device from the P_HDM server.

In the connection step, the home device may connect to the WG_HDM using default HTTP credentials.

In one preferred embodiment, there is provided, before the connection step:
  a step of the home device connecting a broadband remote access server (BRAS) using default point-to-point protocol credentials, and
  a step of the BRAS directing the home device to the WG_HDM server.

The method as claimed in any of the preceding claims, wherein the pre-activation cycle comprises a step of the WG_HDM server registering home device default information in a WG_HDM data store.

Connection request credentials may be either generated or retrieved from the home device by the WG_HDM server.

In one preferred embodiment, the pre-activation cycle comprises the steps of:
  the WG_HDM server contacting an operational support system (OSS);
  the WG_HDM server retrieving subscriber data from the OSS;
  the WG_HDM server implementing subscriber data (e.g. including at least one of the following: subscriber ID, service tags, user tags, public HTTP username and password) in the home device.

The retrieved subscriber data are preferably stored in a WG_HDM data store.

Home device activation parameters (e.g. including correct point-to-point protocol (PPP) and HTTP credentials, and P_HDM server uniform resource locator (URL)) may be either retrieved or generated by the WG_HDM server. Preferably, there is provided a further step of the WG_HDM server provisioning the home device with these activation parameters.

In one preferred embodiment, the transfer step includes the following substeps:
  a step of the home device connecting a broadband remote access server (BRAS) using the correct PPP credentials, and
  a step of the BRAS directing the home device to the P_HDM server based on the correct P_HDM URL.

The above and other objects and advantages of the invention will become apparent from the detailed description of preferred embodiments, considered in conjunction with the accompanying drawings in which.

Figure 1:
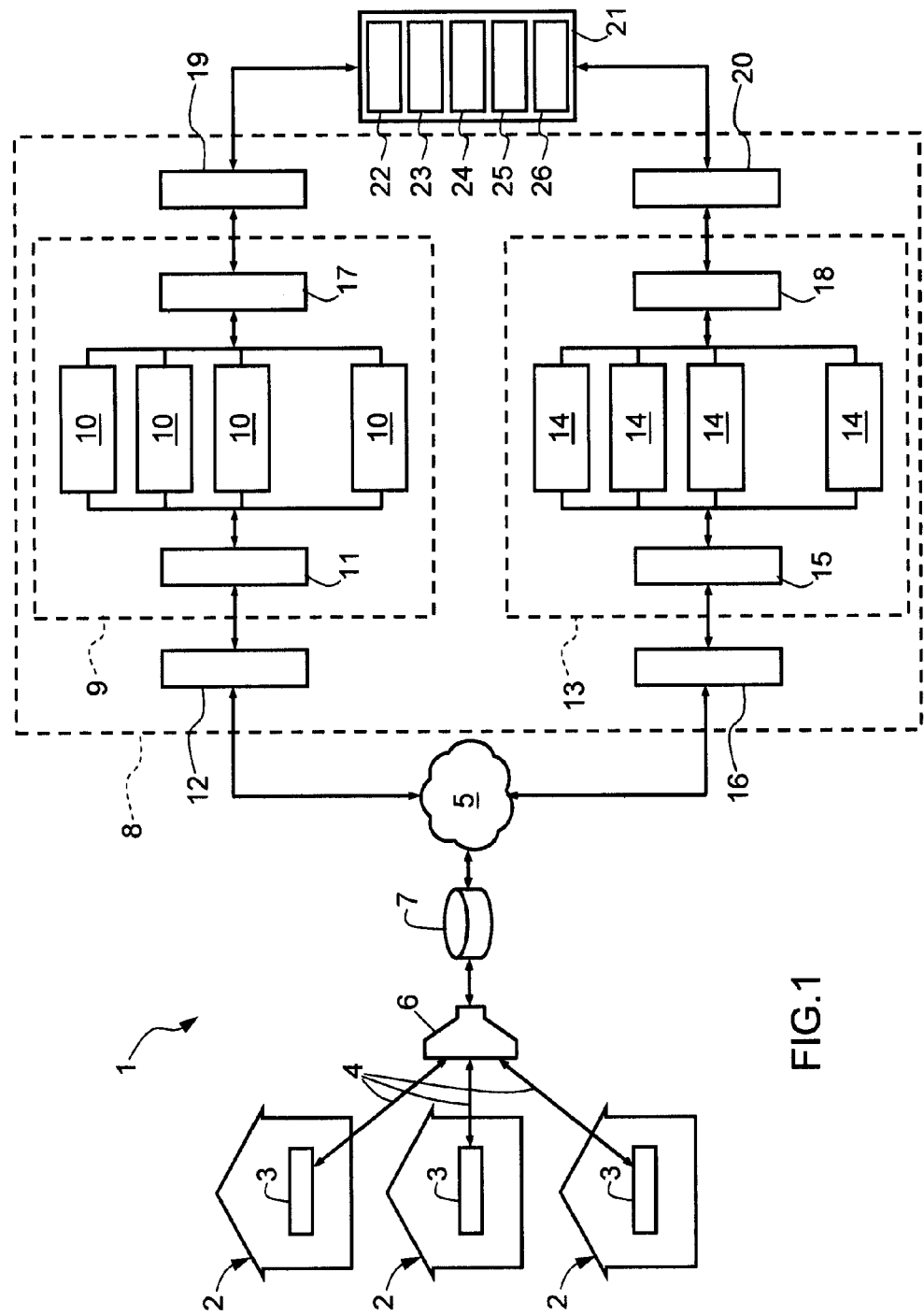
FIG. 1 is a block diagram showing a telecommunication environment for deployment of a remote management method according to an embodiment of the present invention.

Turning now to the drawings and with particular attention to FIG. 1, there is shown a telecommunication system or environment 1 including customer (also called subscriber)

premises 2 where at least one customer premises equipment (CPE) 3, such as a residential gateway (RGW) is installed and connected to a digital subscriber line (DSL) 4. The DSL line 4 links the CPE 3 to a wide area network (WAN) 5 such as the Internet. Before it reaches the Internet 5, the signal goes through a digital subscriber line access multiplexer (DSLAM) 6 for aggregating the data streams and a broadband remote access server (BRAS) 7 for authenticating the subscriber's credentials and routing the data to the Internet 5.

For purposes which will become apparent hereinafter, the telecommunication environment 1 also includes a weblogic server domain 8 connected to the Internet 5 and partitioned in:

a restricted or walled garden area network 9 comprising at least one (and preferably a cluster of) walled garden home device management (WG_HDM) server(s) 10 connected to the Internet 5 through a load balancer 11 behind a firewall 12, and a public area network 13 comprising at least one (and preferably a cluster of) public home device management (P_HDM) server(s) 14 also connected to the Internet 5 through a load balancer 15 behind a firewall 16.

Both WG_HD servers 10 and P_HDM servers 14 have connection capabilities, through a load balancer 17, 18 behind a firewall 19, 20, to a provider's operational support system (OSS) 21 containing subscriber data such as subscriber ID, service tags, user tags, public HTTP username and password.

As in a classical architecture, OSS 21 may include a billing system 22, a workflow management system 23, a subscriber management system 24, a back office system 25 and an inventory system 26.

Figure 2:
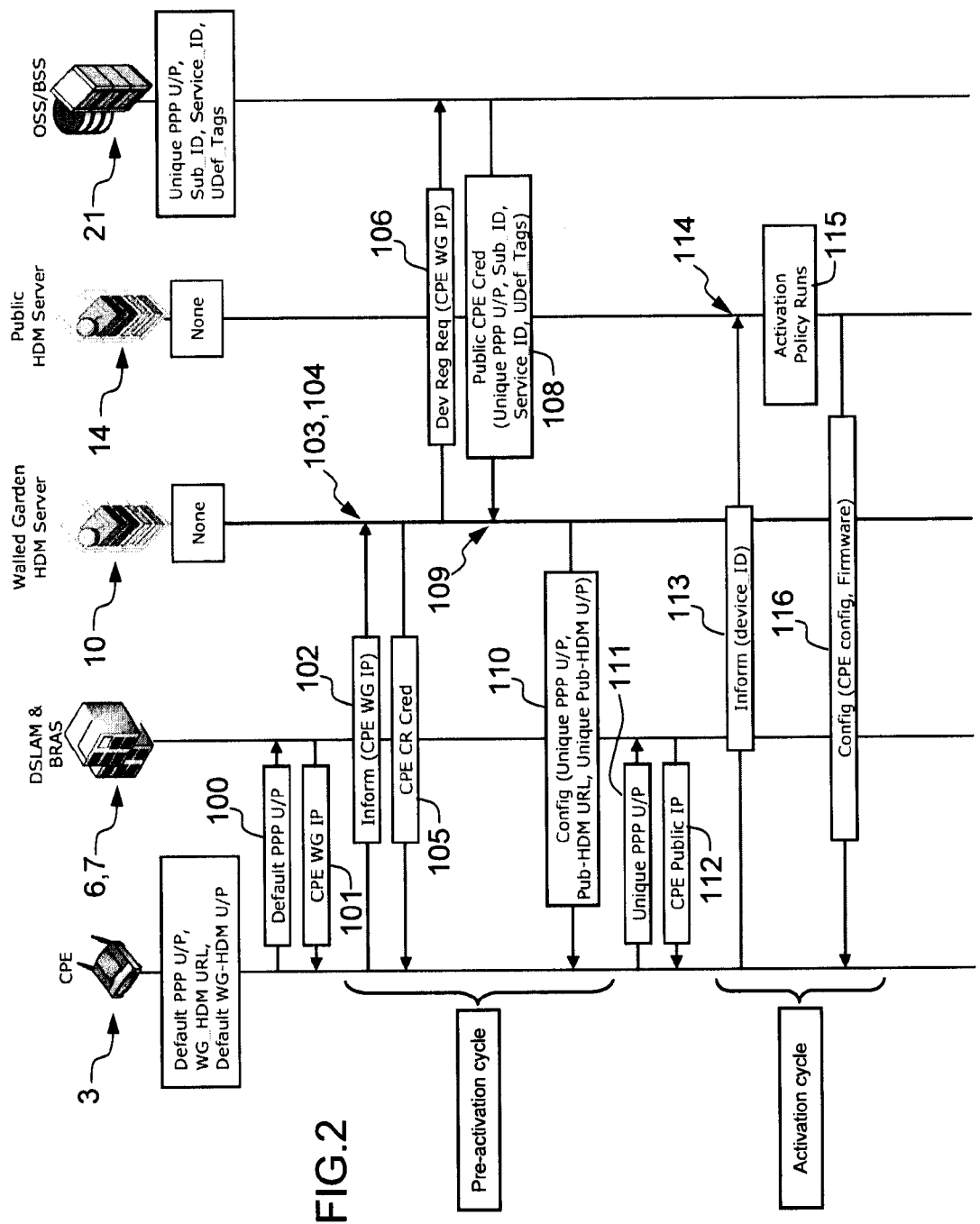
FIG. 2 is a diagram illustrating signal flow in a management method according to an embodiment of the present invention.

Such telecommunication environment architecture is suitable for CPE remote management, and more specifically for CPE automatic or "zero-touch" activation, as will be described hereinafter with reference to FIG. 2.

Before the zero-touch activation process is conducted, it is assumed that:

The subscriber has received a new CPE 3 (for example, after having purchased it from a retail store) and has plugged it into the DSL line 4.

OSS 21 contains subscriber data, but no CPE information.

The HDM servers 10, 14 contain neither CPE nor subscriber data. In particular, the HDM servers 10, 14 are not pre-provisioned with subscriber data from the OSS 21.

CPE 3 is pre-provisioned with a default, temporary auto configuration server (ACS) uniform resource locator (URL) that enables it to communicate with a WG_HDM server 10.

CPE 3 is pre-provisioned with default point-to-point protocol (PPP) credentials and default hypertext transfer protocol (HTTP) credentials.

When connected to the DSL line 4, the CPE 3 uses the default PPP credentials to connect to the BRAS 7 (step 100).

The BRAS 7 then directs the CPE 3 to a WG_HDM server 10 within the walled garden area network 9 (step 101).

Next, CPE 3 connects to the WG_HDM server 10 using its own default HTTP credentials (step 102).

A pre-activation cycle begins, wherein a pre-activation policy is run on the CPE 3 from the WG_HDM server 10, as will now be described.

The WG_HDM server 10 begins with registering the CPE information in its WG_HDM data store (step 103).

The WG_HDM server 10 then identifies that CPE 3 is not yet ready for activation, and retrieves the correct connection request (CR) credentials. If the correct CR credentials are not available, the WG_HDM server 10 automatically generates them (step 104).

It is to be noted that, when CR credentials are auto-generated, the username is defined using a combination of the organizationally unique identifier (OUI), serial number and product class of the CPE 3. If the product class is not available, the username is defined using the combination of OUI and serial number.

Next, the WG_HDM server 10 creates set parameter value (SPV) actions to provision the CPE 3 with the correct CR credentials (step 105). The WG_HDM server 10 then posts a java messaging service (JMS) queue event to OSS 21, which contains the identity if the new CPE 3 (OUI, product class, serial number), its IP address and a device correlator, in order to request subscriber data from the OSS 21 (step 106).

In reaction, OSS 21 uses the BRAS 7, IP address and DSL number to identify the subscriber, and then retrieves subscriber data from the OSS subscriber management system, e.g. subscriber ID, service tags, user tags, and the public HTTP username and password (step 107).

Thereafter, the OSS 21 sends this information to the WG_HDM server 10 using the WG_HDM northbound interface (NBI). It also sends the source IP address and the WG_HDM device correlator that was sent in the WG_HDM request (step 108).

The WG_HDM server 10 then stores the subscriber data in the WG_HDM data store (step 109).

Once the OSS 21 has sent its response to the WG_HDM server 10, the WG_HDM server 10 identifies that the CPE 3 is still not ready for activation, and retrieves the CPE activation parameters, e.g. the correct PPP and HTTP credentials and the P_HDM server URL. If the correct HTTP credentials are not available, the WG_HDM server 10 automatically generates them.

It is to be noted that, when HTTP credentials are auto-generated, the username is defined using a combination of the OUI, serial number and product class of the CPE 3. If the product class is not available, the username is defined using the combination of OUI and serial number.

The WG_HDM server 10 creates SPV actions to provision the CPE 3 with the correct PPP, HTTP credentials and the P_HDM server URL (step 110), thereby ending the pre-activation cycle.

The CPE 3 is now ready for activation. As the CPE 3 was just provided with new PPP credentials, a new PPP session is established (step 111) with the BRAS 7 which, being informed of the P_HDM server URL (provided at stage 110) by the CPE 3, directs the CPE 3 to a P_HDM server 14 within the public area network 13 (step 112).

An activation cycle then begins. As CPE 3 is now configured to communicate with the P_HDM server 14, the CPE 3 authenticates with the P_HDM server 14 using the correct HTTP credentials, and sends an inform or bootstrap message to the P_HDM server 14 (step 113).

The P_HDM server 14 then determines that the CPE 3 has been prepared for activation (pre-activated) by checking the current state of the CPE 3 (step 114).

Based on the CPE type, the P_HDM server 14 retrieves and executes one or more activation policies on the CPE 3 (steps 115) (more precisely, the P_HDM server 14 executes enabled activation policies).

The P_HDM server 14 stores the result of the CPE activation in its P_HDM data store, posts a result to a JMS topic for use by external systems (e.g. the OSS), and marks the CPE 3 activated with a timestamp of activation in the P_HDM data store.

The activation cycle is the complete, although it may comprise a further step, wherein the P_HDM server 14 operates configuration changes and firmware upgrades on the CPE 3 (step 116).

Once the activation policy has run successfully, the CPE 3 is considered registered, activated, and ready for use in a fully operational manner in the provider's network.

One advantage of the disclosed management method and environment is that it makes it possible for operators to activate CPEs without having to learn CPE information before the device is plugged into the operator's network. A further advantage is that the CPEs no longer need to be configured with all the operator's specific configuration parameters out of the factory or retail. Therefore, a large number of new (and even unknown) CPEs can quickly, often and safely be added to the operator's environment.

The invention claimed is:

1. A method for remote management of a home device (3), said method comprising:
    a connection step wherein the home device (3) connects to a remote walled garden home device management (WG_HDM) server (10) over a wide-area network;
    a pre-activation cycle wherein a pre-activation policy is run on the home device (3) from the WG_HDM server (10), wherein the WG HDM server retrieves or generates home device activation parameters including correct point-to-point protocol (PPP) and HTTP credentials and uniform resource locator (URL) of the P HDM server and provisions the home device with the home device activation parameters, said WG_HDM server connected to said home device over said wide-area-network;
    a transfer step wherein the home device (3) is redirected by the WG_HDM server (10) to a remote public home device management (P_HDM) server (14), wherein the home device connects to a broadband remote access server (BRAS) using the correct PPP credentials and the BRAS directs the home device to the P HDM server based on the correct P HDM URL, said P_HDM server connected to said home device by said wide-area network;
    an activation cycle wherein an activation policy is run on the home device (3) from the P_HDM server (14).

2. The method as claimed in claim 1, wherein, in the connection step, the home device (3) connects to the WG_HDM (10) using default HTTP credentials.

3. The method as claimed in claim 2, further comprising, before the connection step:
    a step of the home device (3) connecting the BRAS(7) using default point-to-point protocol credentials, and
    a step of the BRAS (7) directing the home device to the WG_HDM server (10).

4. The method as claimed in claim 1, wherein the pre-activation cycle comprises a step of the WG_HDM server (10) registering home device default information in a WG_HDM data store.

5. The method as claimed in claim 4, wherein the WG_HDM server (10) retrieves from the home device (3), or generates, connection request credentials.

6. The method as claimed in claim 1, wherein the pre-activation cycle comprises the steps of:
    the WG_HDM server (10) contacting an operational support system (OSS) (21);
    the WG_HDM server (10) retrieving subscriber data from the OSS (21);
    the WG_HDM server (10) implementing subscriber data in the home device (3).

7. The method as claimed in claim 6, wherein subscriber data include at least one of the following: subscriber ID, service tags, user tags, public HTTP username and password.

8. The method as claimed in claim 7, wherein the retrieved subscriber data are stored in a WG_HDM data store.

* * * * *